United States Patent [19]

Policastro et al.

[11] Patent Number: 4,820,781

[45] Date of Patent: Apr. 11, 1989

[54] BLENDS OF SILICONE COPOLYMER AND POLYETHERIMIDE

[75] Inventors: Peter P. Policastro, Niskayuna; Pamela K. Hernandez; Mark W. Davis, both of Clifton Park, all of N.Y.

[73] Assignee: General Electric Company, Schenectady, N.Y.

[21] Appl. No.: 158,434

[22] Filed: Feb. 22, 1988

Related U.S. Application Data

[63] Continuation-in-part of Ser. No. 067,200, Jun. 29, 1987, abandoned.

[51] Int. Cl.⁴ ............................................. C08L 77/00
[52] U.S. Cl. .................................... 525/431; 525/432; 525/436
[58] Field of Search ...................... 525/431, 432, 436

[56] References Cited

U.S. PATENT DOCUMENTS

| | | | |
|---|---|---|---|
| 4,258,155 | 3/1981 | Holub et al. ........................ | 525/431 |
| 4,387,193 | 6/1983 | Giles Jr. ............................... | 525/431 |

Primary Examiner—Melvyn I. Marquis
Attorney, Agent, or Firm—William A. Teoli; James C. Davis, Jr.; James Magee, Jr.

[57] ABSTRACT

Polyetherimide-silicone copolymer blends are provided having improved resistance to water absorption and a $T_g$ of at least 190° C.

10 Claims, No Drawings

BLENDS OF SILICONE COPOLYMER AND POLYETHERIMIDE

REFERENCE TO RELATED APPLICATION

The present application is a continuation-in-part of application Ser. No. 067,200, filed June 29, 1987, and now abandoned, assigned to the same assignee as the present invention and incorporated herein by reference.

BACKGROUND OF THE INVENTION

The present invention relates to injection moldable blends of silicone copolymer and polyetherimide. The silicone copolymer has been found to enhance the properties of the polyetherimide in the resulting blend without significantly reducing the upper-use temperature of the polyetherimide.

Prior to the present invention, polyetherimide, such as shown by Heath et al., U.S. Pat. No. 3,847,867, assigned to the same assignee as the present invention and incorporated herein by reference, have been used in a variety of applications requiring a high performance injection moldable material and a $T_g$ of at least 200° C. Although polyetherimides have exhibited superior solvent resistance, strength, and flame resistance, methods for improving such properties as greater oxygen plasma, and atomic oxygen resistance, lower dielectric constant, lower moisture absorption and improved adhesion and constantly being sought.

One method of lowering the moisture absorption characteristics of polyetherimide required in circuit board applications, is by incorporating silicones, preferably in the form of a silicone copolymer. It has been found, however, that although the resulting blend often has superior moisture absorption resistance, a significant decrease in heat distortion temperature (HDT) of the polyetherimide can be experienced, compared to the HDT of the polyetherimide free of silicone copolymer. In addition, if the silicone copolymer is not compatible or miscible with the polyetherimide, it will be hazy instead of clear, the blend also can show a low $T_g$ for the silicone copolymer and higher $T_g$ for the polyetherimide. It would be desirable, therefore, to be able to incorporate silicone copolymers into polyetherimide without experiencing a substantial reduction in the $T_g$ of the resulting blend compared to the initial polyetherimide $T_g$.

The present invention is based on our discovery that certain silicone copolymers resulting from the intercondensation of aromatic bis(etheranhydride), phthalic anhydride-terminated polydiorganosiloxane and aryldiamine, as defined hereinafter, can be blended with polyetherimides, as defined hereinafter, to produce a blend of silicone copolymer and polyetherimide having a $T_g$ of at least 190° C.

STATEMENT OF THE INVENTION

There is provided by the present invention silicone copolymer-polyetherimide blends having a $T_g$ of at least 190° C. comprising by weight, (A) about 1-99% of polyetherimide, and
(B) about 99%-1% of silicone copolymer comprising from about 10 to 70 mole percent, and preferably from 25 to 50 mole percent of disiloxane units of the formula,

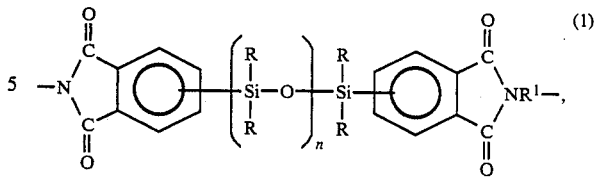

intercondensed with from about 90 to 30 mole % and preferably from 75 to 50 mole percent of etherimide units of the formula,

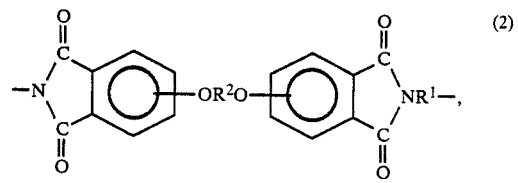

where R is a member selected from the class consisting of the same or different $C_{(1-14)}$ monovalent hydrocarbon radicals and $C_{(1-14)}$ monovalent hydrocarbon radicals substituted with radicals inert during intercondensation, $R^1$ is a member selected from the class consisting of divalent $C_{(2-20)}$ organic radicals and halogenated derivatives thereof, $R^2$ is a divalent $C_{(6-30)}$ aromatic organic radical, and n is an integer having a value of 1 to 5 inclusive.

Radicals which are included within R of formula (1) are, for example, $C_{(1-8)}$ alkyl radicals, such as methyl, ethyl, propyl, butyl, pentyl; alkaryl radicals such as dimethylenephenyl, trimethylenephenyl; $C_{(6-14)}$ aryl radicals such as phenyl, tolyl, xylyl, naphthyl, anthryl; and halogenated derivatives thereof, such as trifluoropropyl, chlorophenyl, chloronaphthyl; cyanoethyl, phthalimido.

Radicals which are included within $R^1$ are, for example, $C_{(6-20)}$ aromatic hydrocarbon radicals, halogenated derivatives of such $C_{(6-20)}$ hydrocarbon radicals, $C_{(2-8)}$ alkylene radicals, and divalent radicals included within the formula,

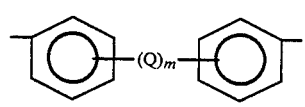

where Q is a member selected from the class consisting of

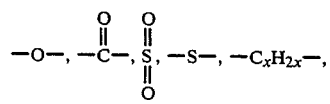

x is a whole number equal to 1 to 5 inclusive, and m is 0 or 1.

Radicals included within $R^2$ are, more particularly,

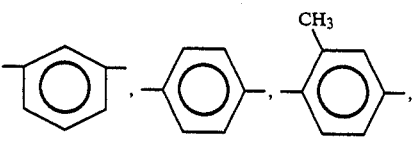

-continued

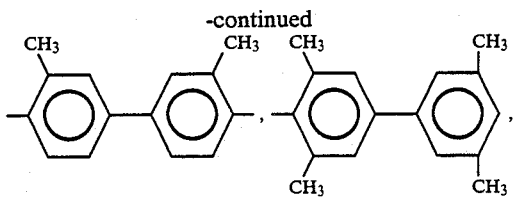

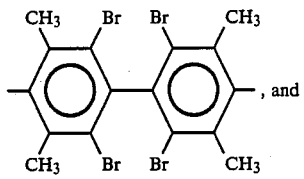

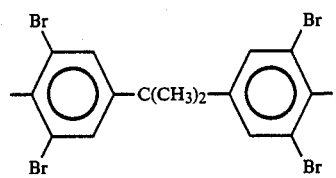

and divalent organic radicals included within the formula,

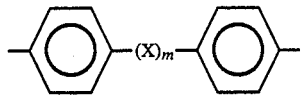

where X is a member selected from the class consisting of divalent radicals of the formulas,

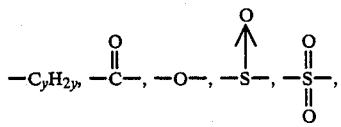

and —S—, where m is 0 or 1, y is a whole number from 1 to 5.

The preferred polyetherimides which are blended with the silicone copolymer in the practice of the present invention can be made by intercondensing aromatic bisetheranhydride of the formula,

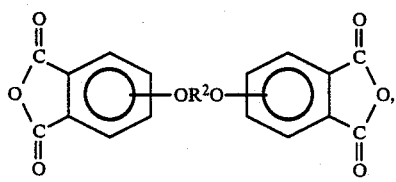

with aryldiamine of the formula,

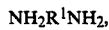  (4)

either under melt conditions or in the presence of an organic solvent, where $R^1$ and $R^2$ are as previously defined.

Silicone copolymer used in the practice of the present invention can be made by intercondensing aryldiamine of formula (4) with a mixture of the aromatic bis(etheranhydride) of formula (3) and a bisphthalic anhydride polysiloxane, or "PADS", of the formula,

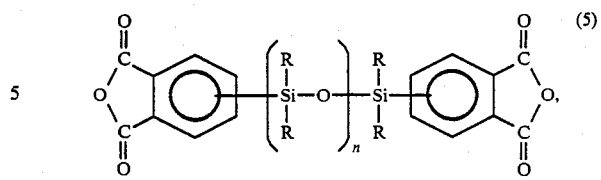

where R and n are as previously defined to provide substantially equal molar amounts of anhydride functional groups and amine functional groups of the aryldiamine of formula (4). A method for making bisphthalicanhydride disiloxane within formula (5) is shown by J. R. Pratt et al., Journal of Organic Chemistry, Vol. 38, No. 25, (1973) pp. 4272-75.

Some of the aryldiamines included within formula (4) which can be used in the practice of the present invention to make the polyetherimide and the silicone copolymer are, for example, m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether;
1,5-diaminonaphthalene,
3,3'-dimethylbenzidine,
3,3'-dimethoxybenzidine,
2,4-diaminotoluene,
2,6-diaminotoluene,
2,4-bis($\beta$-amino-t-butyl)toluene,
bis(p-$\beta$-methyl-o-aminopentyl)benzene, and
1,3-diamino-4-isopropylbenzene.

The polyetherimide-silicone copolymer blend can be made by dissolving the polyetherimide and silicone copolymer in an appropriate inert organic solvent such as chloroform to produce a solution having about 10 to 40% by weight solids. The solution blend then can be cast onto appropriate substrate, such as a glass plate, to a desired thickness and allowed to stand overnight. The cast film will be either transparent or hazy depending upon the proportions of chemically combined etherimide units and disiloxane units in the silicone copolymer. Blends also can be obtained by combining materials in the melt, with agitation, for example in an extruder reactor or heated mixing bowl.

Blends of silicone copolymer and polyetherimide can be used in a variety of applications, such as coatings, adhesives, composite materials, and molding compounds.

The blends have added benefits over polyetherimides, such as improved oxygen plasma, atomic oxygen resistance, lower dielectric constant, lower moisture absorption, and improved adhesion. Fillers such as glass fiber, carbon fiber, can be incorporated into the blends in proportions of from 5 to 100 parts by weight of filler, per hundred parts of blend.

The following examples are given by way of illustration and not by way of limitation. All parts are by weight.

EXAMPLE 1

A series of silicone copolymers were prepared by effecting reaction between 1,3-bis(4'-phthalic anhydride)-tetramethyldisiloxane (PADS), 2,2-bis[4-(3,4- dicarboxyphenoxy)phenyl]propane dianhydride (BPADA), and metaphenylenediamine (MPD). In some instances paraphenylenediamine (PPD) was used in combination with MPD. Reaction of the aforementioned reactants was conducted in ortho-dichlorobenzene in the presence of 0.5 weight % N,N-dimethylaminopyridine (DMAP) to provide a 30 weight % solids in the reaction mixture. Water of imidization was removed by azeotropic distillation of the reaction mixture at temperatures in the range of about 170° C. After removal of water, the reaction mixture was heated for several hours at 180° C., cooled, and the polymeric product precipitated twice from methanol. The molecular weight of the resulting silicone copolymer was evaluated by intrinsic viscosity measurements in chloroform which ranged between 0.55 and 0.70 dl/g.

A series of polyetherimide-silicone copolymer blends were prepared by dissolving in chloroform, the commercially available Ultem ® polyetherimide and silicone copolymer to produce a solution having 30% by weight of solids. The blend solutions were cast on a glass plate to a thickness of about 10 mil and allowed to stand overnight. The cast blend was determined "miscible" if no haziness in the film was evident. The following results were obtained where $T_g$ is glass transition temperature, "plus" under miscibility indicates no haziness "minus" under miscibility indicates haziness in the resulting cast film, and "Wt% polyetherimide" means the weight of polyetherimide, divided by the weight of the blend × 100%.

| Silicone Copolymer Polyetherimide Blends | | | |
|---|---|---|---|
| Silicone copolymer (mole ratio) | Wt % Polyetherimide | $T_g$ (°C.) | Miscibility |
|  | 100 | 217 |  |
| PADS/BPADA/MPD (1:1:2) | 50 | 202 | + |
| PADS/BPADA/MPD (1:1:2) | 25 | 196 | + |
| PADS/BPADA/MPD (1:1:2) | 10 | 193 | + |
| PADS/BPADA/MPD (75:25:100) | 50 | 175,215 | − |
| PADS/BPADA/MPD (75:25:100) | 25 | 175,215 | − |
| PADS/BPADA/MPD/PPD (1:1:1:1) | 50 | 210 | + |
| PADS/BPADA/MPD/PPD (50:50:75:25) | 50 | 208 | + |

The above results show that major amounts of silicone copolymer can be blended with polyetherimide without substantially affecting the $T_g$ of the polyetherimide. It was also found that blends having a range of 5% to 95% by weight of silicone copolymer can exhibit substantially the same $T_g$ as shown for 50% by weight of silicone copolymer. In instances where silicone copolymer having a 3 to 1 mole ratio of PADS to BPADA was blended with polyetherimide, the blend was found to be hazy. The hazy blends showed a $T_g$ for the silicone copolymer and a separate $T_g$ for the polyetherimide.

EXAMPLE 2

In accordance with the procedure of Example 1, a mixture of 12 grams of ULTEM ® polyetherimide having an intrinsic viscosity in chloroform of about 0.55 dl/g at 25° C. and 12 grams of a silicone copolymer was blended in a Braebender mixing bowl at 320° C. for 5 minutes to produce a finely dispersed heterogeneous mixture. The silicone copolymer was the intercondensation reaction product of equal molar amounts of PADS and BPADA with a molar equivalent to total anhydride of PPD. The blend was removed from the mixing bowl in the molten state and was allowed to cool to room temperture. A preformed slab was then sandwiched between two steel plates and the resulting composite was heated to a temperature of 300° C. at a pressure of 5000 psi to form a laminate. The resulting laminate exhibited excellent interlevel adhesion.

Although the above examples are directed to only a few of the very many variables which can be employed in the practice of the present invention, it should be understood that the present invention is directed to a much broader variety of blends of polyetherimides and silicone polyimides as shown in the description preceding these examples.

What is claimed and sought to be protected by Letters Patent of the United States is as follows:

1. A silicone copolymer-polyetherimide blend having a $T_g$ of at least 190° C. comprising by weight,
   (A) about 1-99% of polyetherimide, and
   (B) about 99%-1% of silicone copolymer comprising from about 10 to 70 mole percent of disiloxane units of the formula,

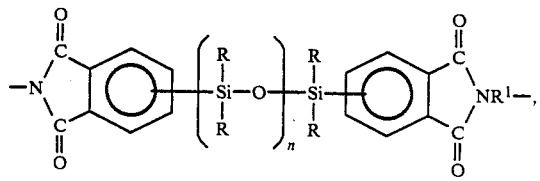

interconnected with from 90 to 30 mole % of etherimide units of the formula,

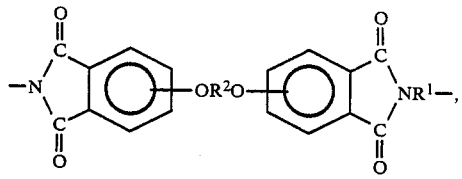

where R is a member selected from the class consisting of the same or different $C_{(1-14)}$ monovalent hydrocarbon radicals and $C_{(1-14)}$ monovalent hydrocarbon radicals substituted with radicals inert during intercondensation, $R^1$ is selected from the class consisting of divalent $C_{(2-20)}$ organic radicals and halogenated derivatives thereof, $R^2$ is a divalent $C_{(6-30)}$ aromatic organic radical, and n is an integer having a value of 1 to 5 inclusive.

2. A blend in accordance with claim 1, where

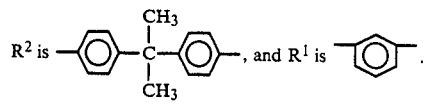

3. A silicone copolymer polyetherimide blend in accordance with claim 1, where R is methyl,

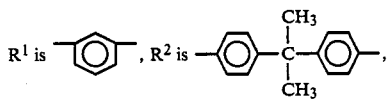

and n is 1.

4. A silicone copolymer polyetherimide blend in accordance with claim 1, which is substantially transparent.

5. A silicone copolymer-polyether blend in accordance with claim 1, where R is methyl, $R^1$ is a mixture of

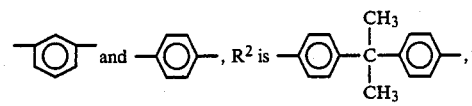

and n is 1.

6. A blend in accordance with claim 1, where $R^1$ is

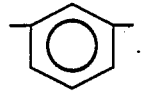

7. A blend in accordance with claim 1, of about 50% by weight of polyetherimide and 50% by weight of silicone copolymer.

8. A silicone copolymer polyetherimide blend in accordance with claim 1, where R is methyl,

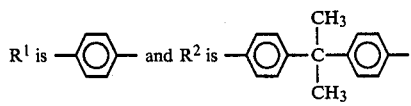

and n is 1.

9. A blend of silicone copolymer and a polyetherimide having a $T_g$ of at least 190° C. comprising by weight, (A) about 1–99% of polyetherimide, and (B) about 99–1% of silicone copolymer comprising from about 10 to 50 mole percent of disiloxane units of the formula,

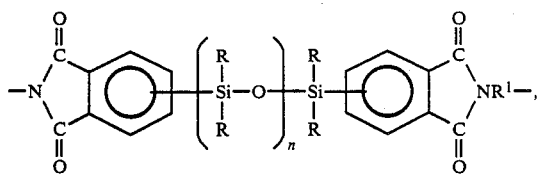

intercondensed with from 90 to 50 mole % of etherimide units of formula,

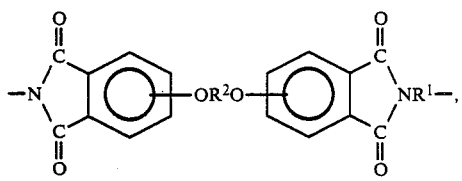

where R is a member selected from the class consisting of the same or different $C_{(1-14)}$ monovalent hydrocarbon radicals and $C_{(1-14)}$ monovalent hydrocarbon radicals substituted with radicals inert during intercondensation, $R^1$ is selected from the class consisting of divalent $C_{(2-20)}$ organic radicals and halogenated derivatives thereof, $R^2$ is a divalent $C_{(6-30)}$ aromatic organic radical, and n is an integer having a value of 1 to 5 inclusive.

10. A blend in accordance with claim 9, where

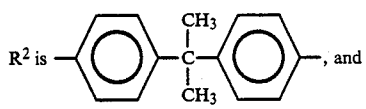

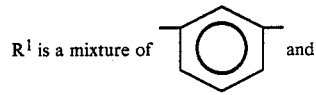

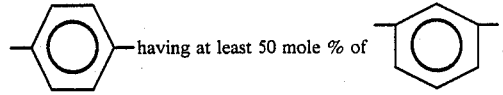

* * * * *